US010045098B2

(12) United States Patent
Adiletta et al.

(10) Patent No.: US 10,045,098 B2
(45) Date of Patent: Aug. 7, 2018

(54) TECHNOLOGIES FOR SWITCHING NETWORK TRAFFIC IN A DATA CENTER

(71) Applicant: Intel Corporation, Santa Clara, CA (US)

(72) Inventors: Matthew Adiletta, Bolton, MA (US); Aaron Gorius, Upton, MA (US); Myles Wilde, Charlestown, MA (US); Michael Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/395,203

(22) Filed: Dec. 30, 2016

(65) Prior Publication Data

US 2018/0027312 A1    Jan. 25, 2018

Related U.S. Application Data

(60) Provisional application No. 62/365,969, filed on Jul. 22, 2016, provisional application No. 62/376,859, filed on Aug. 18, 2016, provisional application No. 62/427,268, filed on Nov. 29, 2016.

(51) Int. Cl.
*H04J 14/00* (2006.01)
*H04Q 11/00* (2006.01)

(52) U.S. Cl.
CPC . *H04Q 11/0005* (2013.01); *H04Q 2011/0041* (2013.01); *H04Q 2011/0073* (2013.01); *H04Q 2213/13523* (2013.01)

(58) Field of Classification Search
CPC . H04L 12/4633; H04L 45/02; H04L 12/4641; H04L 12/66; H04L 12/2834; H04L 12/5692; H04L 29/06027; H04L 43/0882; H04L 49/00; H04L 49/10; H04L 49/70; H04L 69/08
USPC .......................................................... 398/45
See application file for complete search history.

(56) References Cited

U.S. PATENT DOCUMENTS 6,367,018 B1   4/2002  Jain
7,415,022 B2   8/2008  Kadambi et al.
7,835,388 B2  11/2010  Hu
(Continued)

OTHER PUBLICATIONS

International search report for PCT application No. PCT/US2017/038552, dated Oct. 11, 2017 (3 pages).
(Continued)

*Primary Examiner* — Don N Vo
(74) *Attorney, Agent, or Firm* — Barnes & Thornburg LLP

(57) ABSTRACT

Technologies for switching network traffic include a network switch. The network switch includes one or more processors and communication circuitry coupled to the one or more processors. The communication circuity is capable of switching network traffic of multiple link layer protocols. Additionally, the network switch includes one or more memory devices storing instructions that, when executed, cause the network switch to receive, with the communication circuitry through an optical connection, network traffic to be forwarded, and determine a link layer protocol of the received network traffic. The instructions additionally cause the network switch to forward the network traffic as a function of the determined link layer protocol. Other embodiments are also described and claimed.

30 Claims, 15 Drawing Sheets

(56) References Cited

U.S. PATENT DOCUMENTS

| | | | |
|---|---|---|---|
| 2006/0184670 A1* | 8/2006 | Beeson | H04L 43/026 709/224 |
| 2011/0228767 A1* | 9/2011 | Singla | H04L 49/00 370/389 |
| 2012/0099863 A1 | 4/2012 | Xu et al. | |
| 2014/0012961 A1* | 1/2014 | Pope | H04L 69/14 709/220 |
| 2015/0334867 A1 | 11/2015 | Faw et al. | |
| 2016/0231939 A1* | 8/2016 | Cannata | G06F 3/0604 |
| 2017/0279705 A1* | 9/2017 | Lin | H04L 45/02 |

OTHER PUBLICATIONS

Written opinion for PCT application No. PCT/US2017/038552, dated Oct. 11, 2017 (7 pages).

\* cited by examiner

TECHNOLOGIES FOR SWITCHING NETWORK TRAFFIC IN A DATA CENTER

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

In a typical data center that provides computing services, such as cloud services, multiple compute devices may be assigned workloads to provide the requested services for a client. Given the latency and bandwidth limitations of twisted-pair copper cabling and the corresponding networking components (e.g., switches) in such data centers, the physical hardware resources, including processors, volatile and non-volatile memory, accelerator devices (e.g., co-processors, field programmable gate arrays (FPGA), digital signal processors (DSPs), application specific integrated circuits (ASICs), etc.), and data storage devices, that may be utilized to perform any given workload are typically included locally in each compute device, rather than being dispersed throughout the data center. As such, depending on the types of workloads assigned (e.g., processor intensive but light on memory use, memory intensive but light on processor use, etc.), a data center may include many unused physical hardware resources and yet be unable to take on additional work without overloading the compute devices.

Furthermore, some typical data centers are designed to operate as a high performance computing (HPC) cluster, using a specialized networking protocol (e.g., Intel Omni-Path) to coordinate the communication and processing of workloads, while other data centers are designed to communicate using other communication protocols, such as Ethernet. The networking components in typical data centers are not equipped to manage both HPC network traffic and other types of network traffic, thereby limiting their usefulness to specific workload types.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
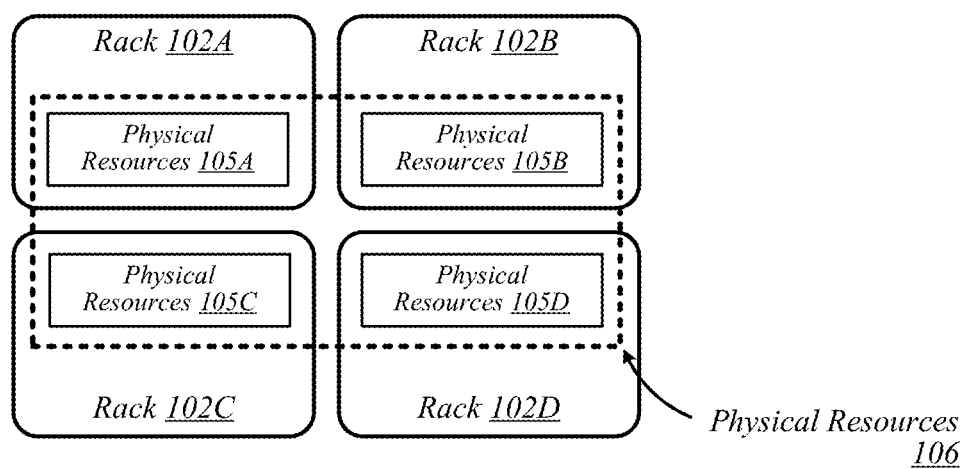
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs) or other memory modules or stacks, are located on a bottom side of the sled. As a result of the enhanced airflow provided by this design, the components may operate at higher frequencies and power levels than in typical systems, thereby increasing performance. Furthermore, the sleds are configured to blindly mate with power and data communication interfaces (e.g., cables, bus bars, optical interfaces, etc.) in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies. In the illustrative embodiment, the power sources include 277 VAC inputs to power supply units (PSUs), to reduce the input current, and reduce the losses that may occur if higher input currents were used to compensate for lower input voltages. Additionally, in the illustrative embodiment, more current input is provided to each sled to allow each sled to reach higher power operating points.

Figure 2:
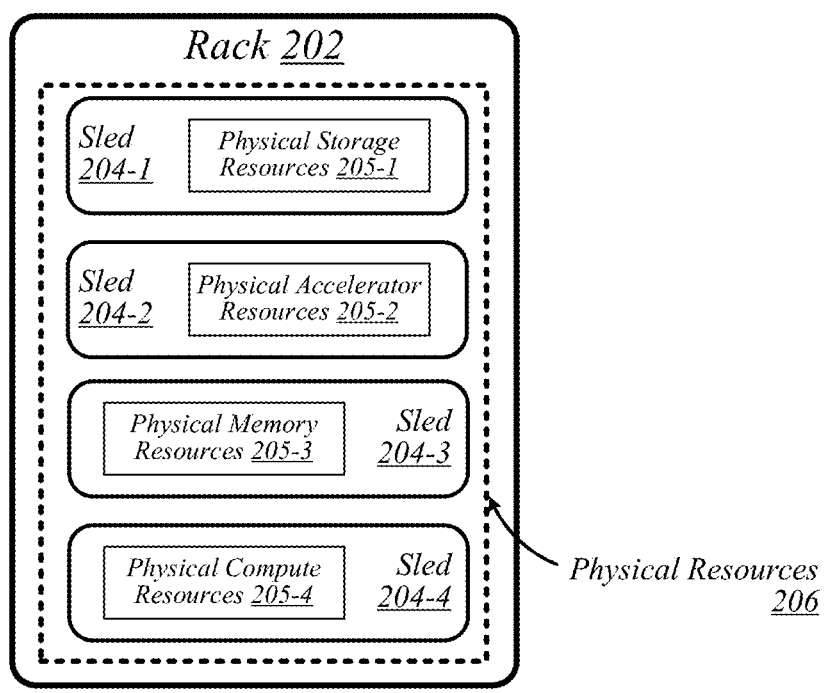
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate. In the illustrative embodiment, "robotically accessible" and "robotically manipulatable" means easily accessible and easily manipulatable, such that a robot or human could complete the operation.

Figure 3:
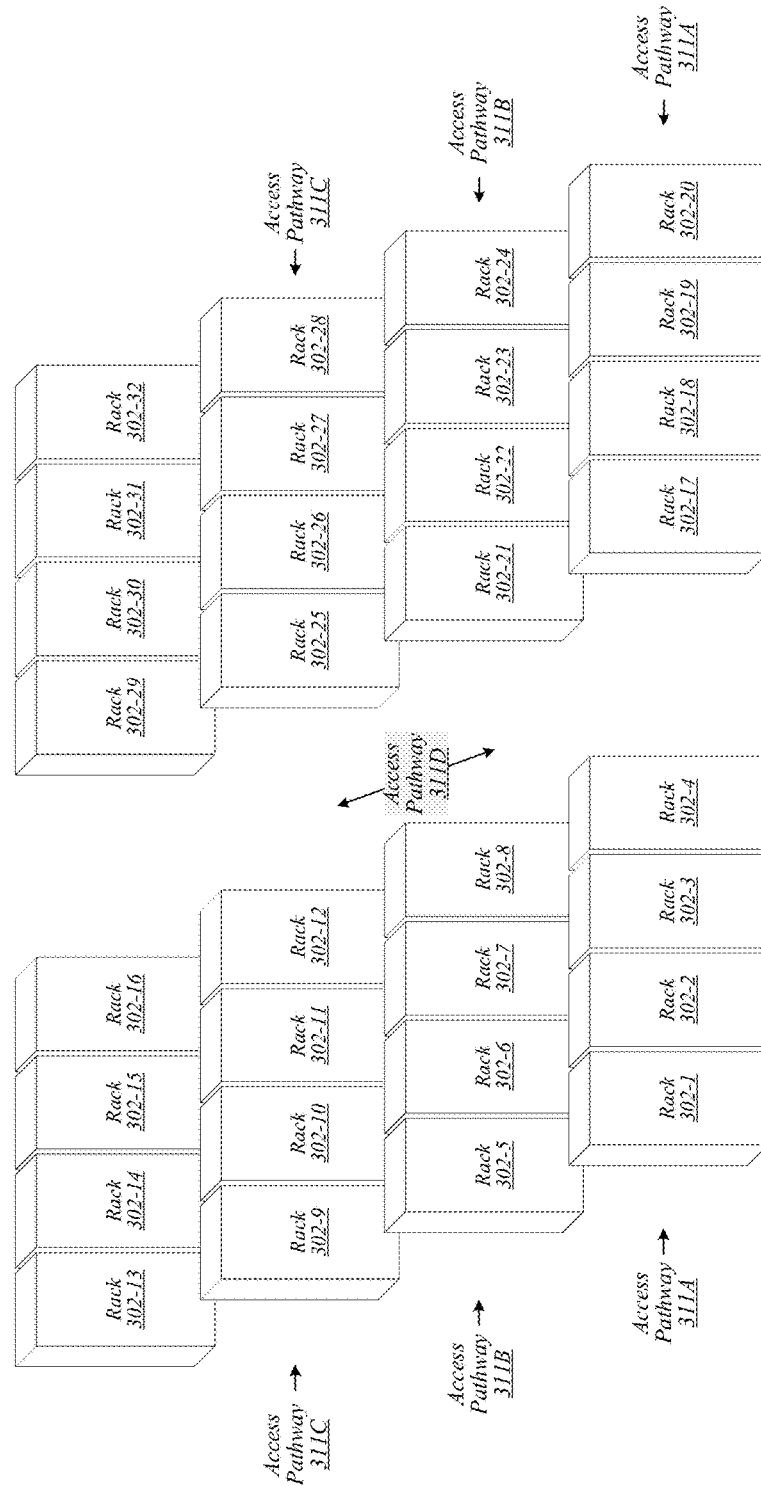
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
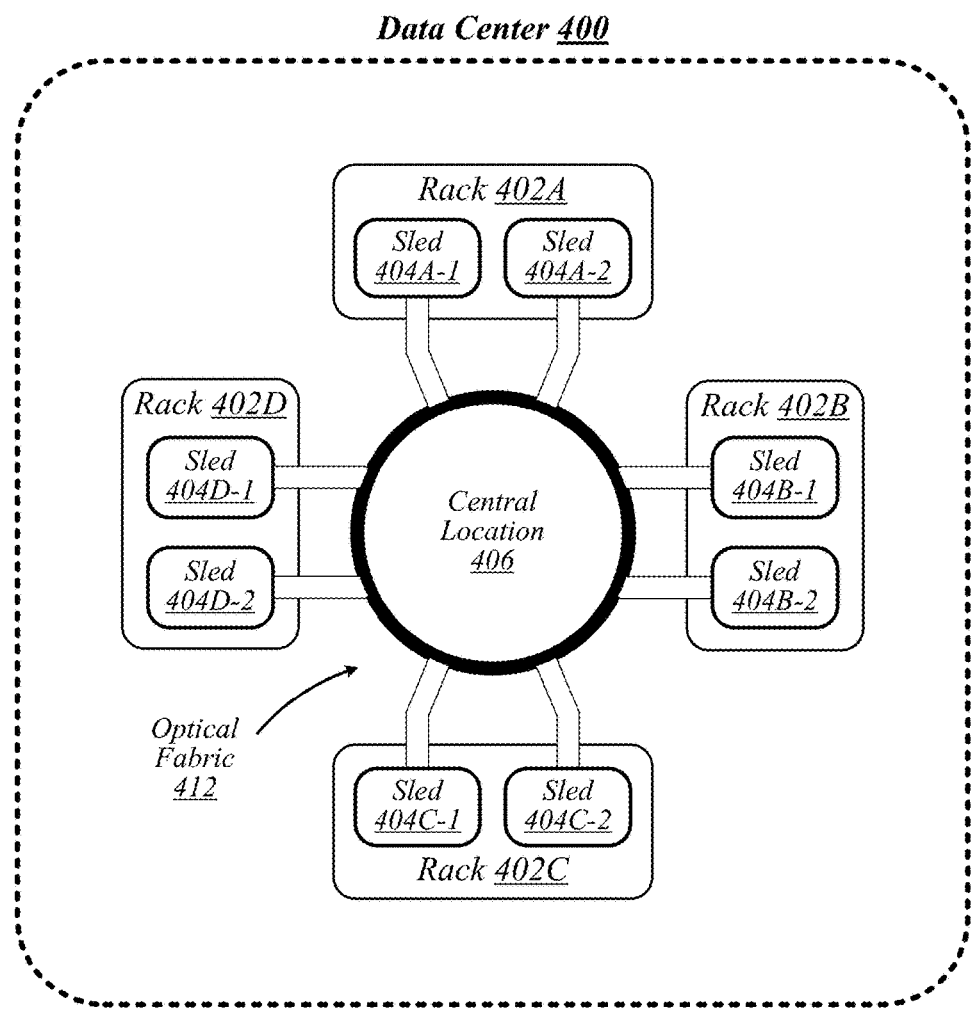
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling, also referred to herein as optical fiber or fiber bundles) and optical switching infrastructure, including one or more switches 515 (also referred to herein as network switches) that may be included in a central location 406, via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
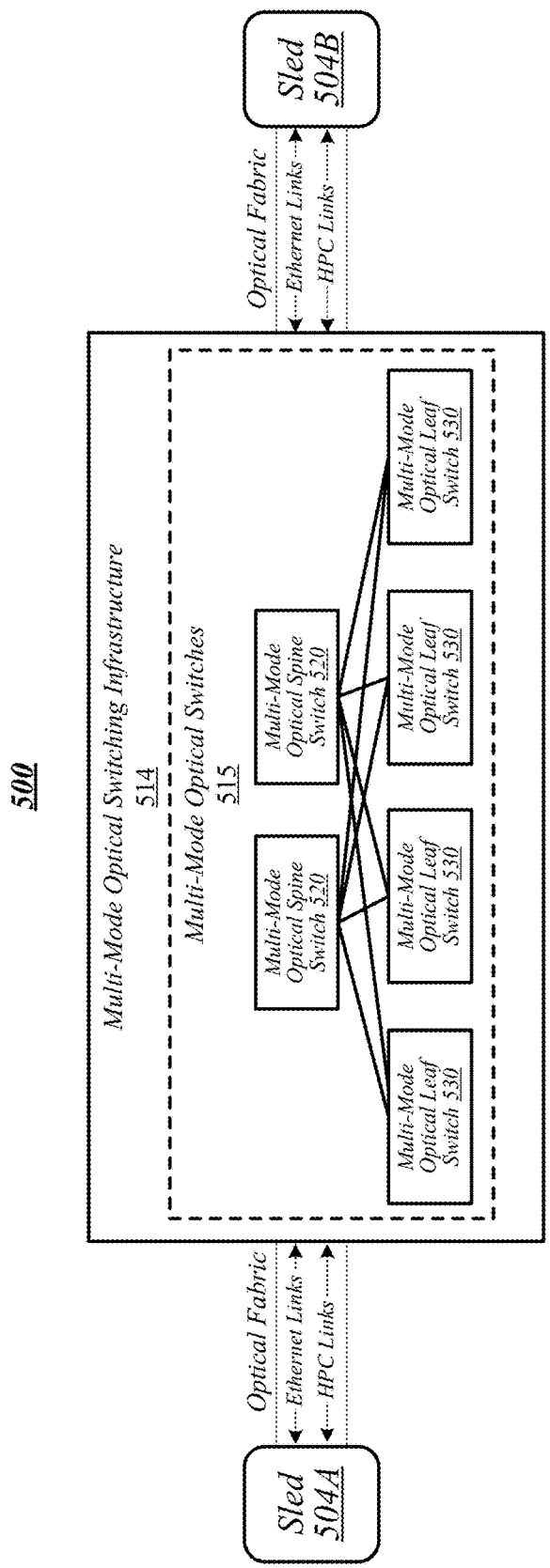
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a multi-mode optical switching infrastructure 514. Multi-mode optical switching infrastructure 514 may generally comprise a switching infrastructure that is capable of receiving communications according to multiple link-layer protocols via a same unified set of optical signaling media, and properly switching such communications. In various embodiments, multi-mode optical switching infrastructure 514 may be implemented using one or more multi-mode optical switches 515. In various embodiments, multi-mode optical switches 515 may generally comprise high-radix switches. In some embodiments, multi-mode optical switches 515 may comprise multi-ply switches, such as four-ply switches. In various embodiments, multi-mode optical switches 515 may feature integrated silicon photonics that enable them to switch communications with significantly reduced latency in comparison to conventional switching devices. In some embodiments, multi-mode optical switches 515 may constitute leaf switches 530 in a leaf-spine architecture additionally including one or more multi-mode optical spine switches 520.

In various embodiments, multi-mode optical switches 515 may be capable of receiving both Ethernet protocol communications carrying Internet Protocol (IP packets) and communications according to a second, high-performance computing (HPC) link-layer protocol (e.g., Intel's Omni-Path Architecture's, InfiniBand) via optical signaling media of an optical fabric. Other native protocols may be included, such as raw acceleration intercommunication protocols, storage protocols, or even application-specific protocols that are not embedded or tunneled within existing IP or Omni-Path fabric protocols. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example. In some embodiments, the switches 515 are in a central location (e.g., the central location 406) in the data center 100 rather than being located within the racks, thereby enabling the switches 515 to be easily accessed by a human. Furthermore, each sled 504 may be coupled to four switches 515 that each provides one quarter of a total bandwidth, such as a 50 gigabits per second upstream fiber optic connection and a 50 gigabits per second downstream fiber optic connection of a total bandwidth of 200 gigabits per second upstream and 200 gigabits per second downstream. In other embodiments, the total bandwidth may be a different amount than 200 gigabits per second upstream and 200 gigabits per second downstream. For example, in other embodiments, each optical fiber may provide greater than 50 gigabits per second upstream and 50 gigabits per second downstream. As a result, each sled 504 may receive a total upstream bandwidth of 200 gigabits per second and a total downstream bandwidth of 200 gigabits per second. By spreading the bandwidth among multiple switches 515, if any one switch 515 becomes inoperative, the other three fourths of the bandwidth (e.g., 150 gigabits) remains available. As such, the connectivity scheme in such embodiments is more failure tolerant than embodiments in which all of the available bandwidth is consolidated in a single switch.

Figure 6:
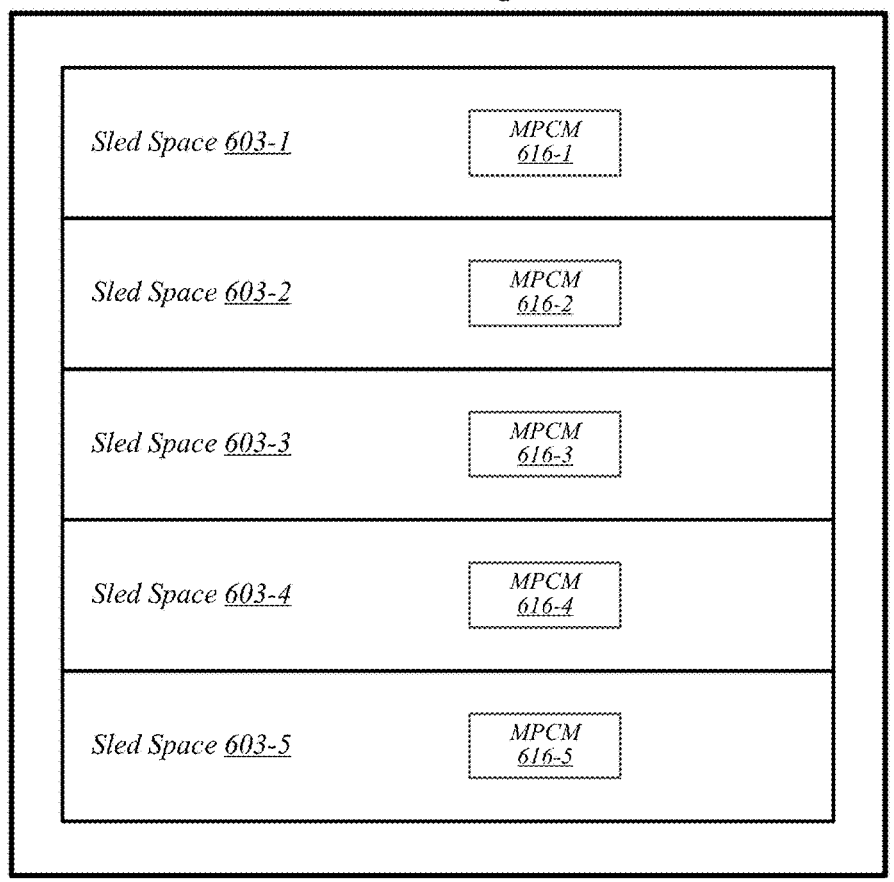
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically or humanly accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. When a sled is inserted into any given one of sled spaces 603-1 to 603-5, the corresponding MPCM (e.g., MPCM 616-3) may couple with a counterpart MPCM of the inserted sled. This coupling may provide the inserted sled with connectivity to both signaling infrastructure and power infrastructure of the rack in which it is housed. Included among the types of sleds to be accommodated by rack architecture 600 may be one or more types of sleds that feature expansion capabilities.

Figure 7:
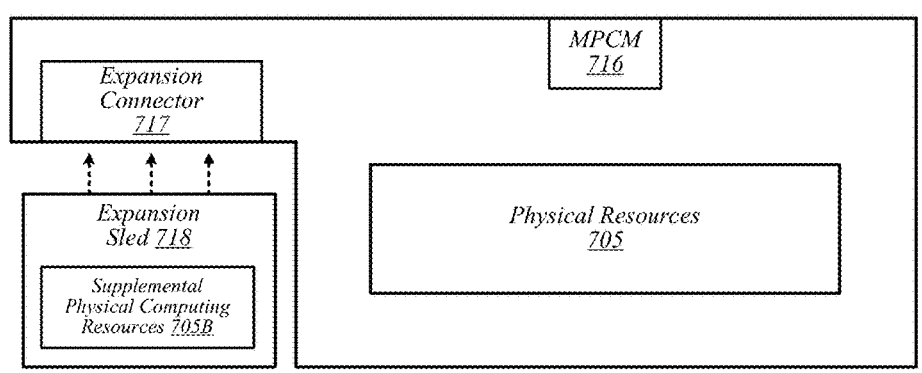
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
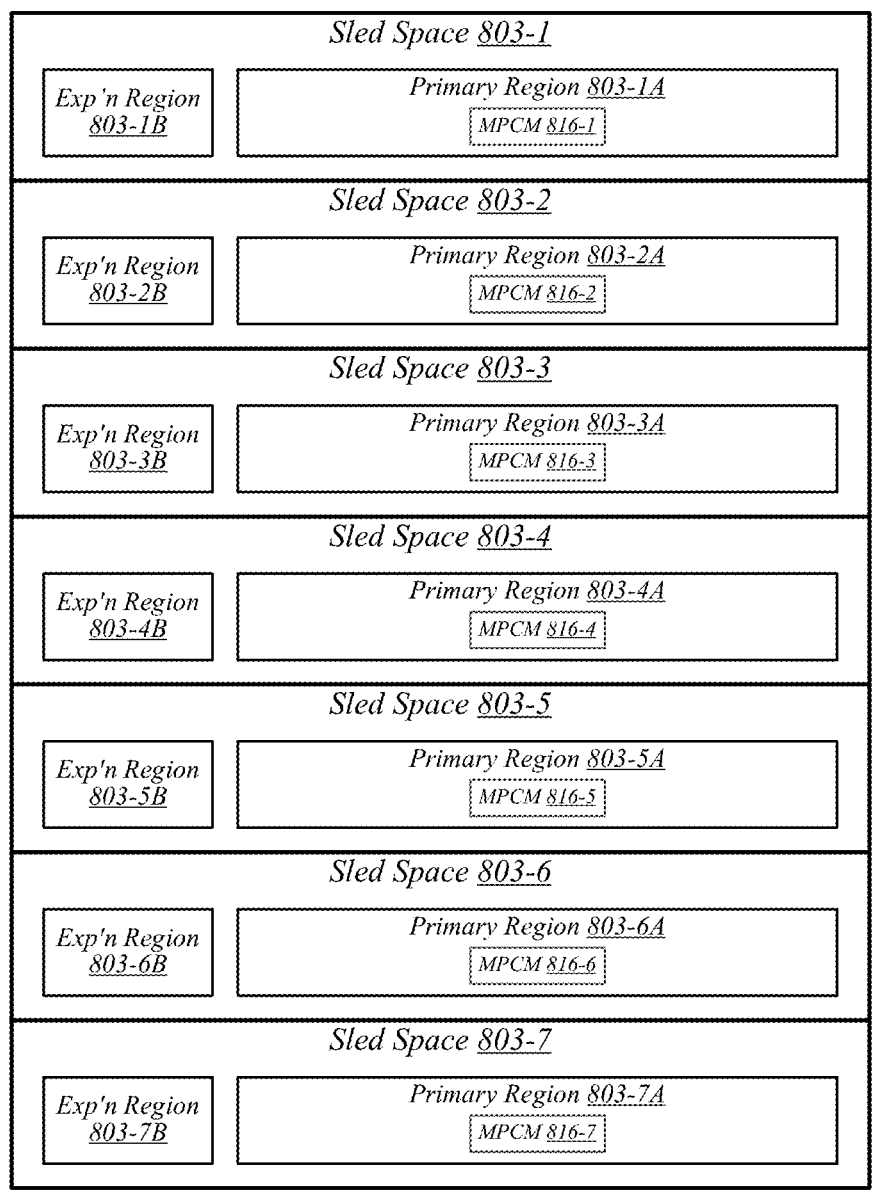
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
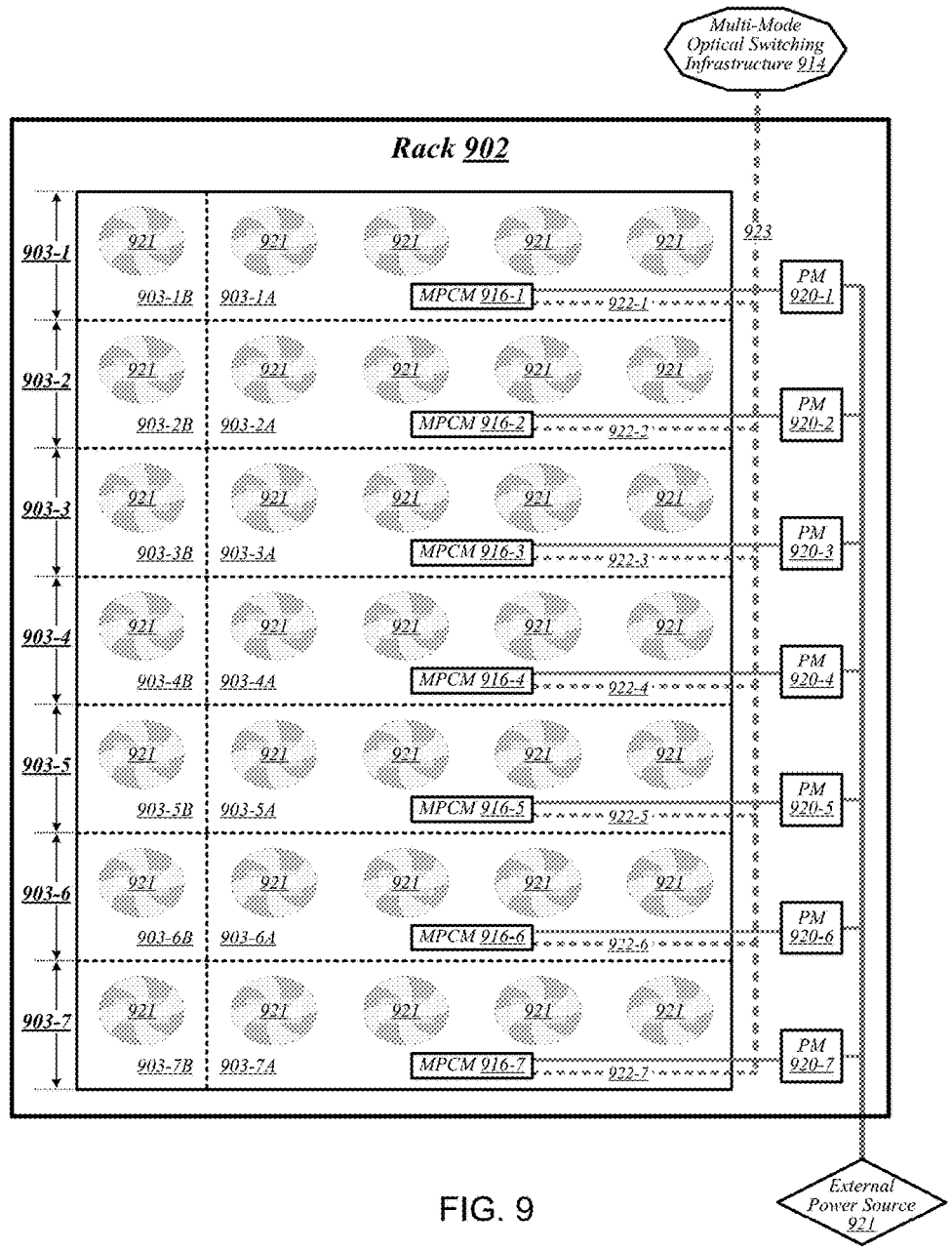
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a multi-mode optical switching infrastructure 914, which may be the same as—or similar to—multi-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to multi-mode optical switching infrastructure 914 via respective lengths of optical cabling 922-1 to 922-7, also referred to herein as optical fiber. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
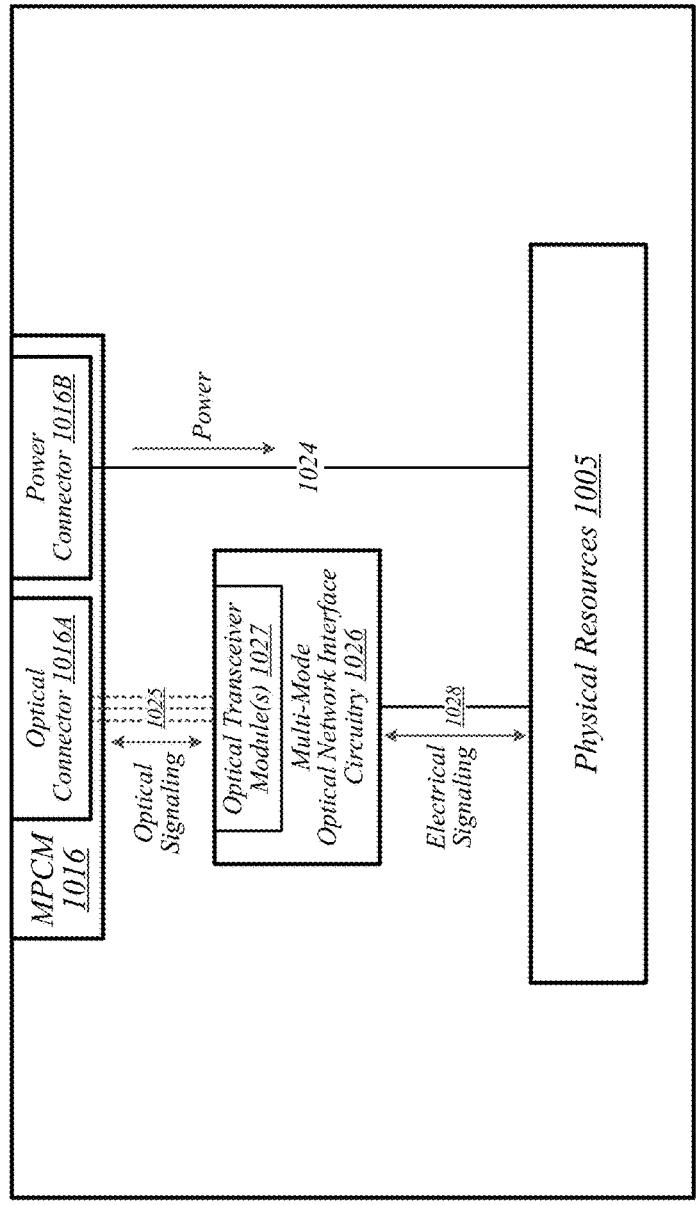
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include multi-mode optical network interface circuitry 1026. Multi-mode optical network interface circuitry 1026 may generally comprise circuitry that is capable of communicating over optical signaling media according to each of multiple link-layer protocols supported by multi-mode optical switching infrastructure 914 of FIG. 9. In some embodiments, multi-mode optical network interface circuitry 1026 may be capable both of Ethernet protocol communications and of communications according to a second, high-performance protocol. In various embodiments, multi-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and multi-mode optical network interface circuitry 1026, via each of a set of optical channels 1025. Multi-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
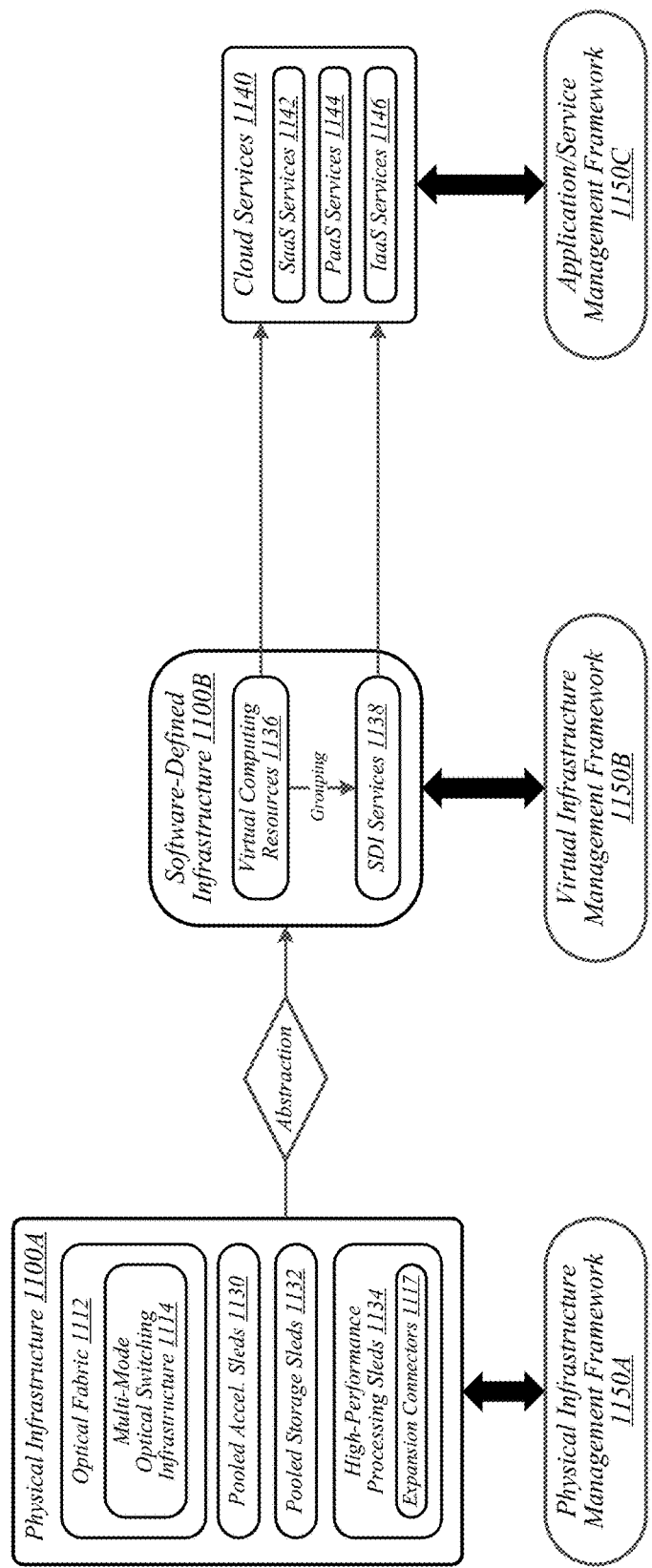
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) or other physical tag associated with each component to be installed. The embodiments are not limited in this context.

As shown in FIG. 11, the physical infrastructure 1100A of data center 1100 may comprise an optical fabric 1112, which may include a multi-mode optical switching infrastructure 1114. Optical fabric 1112 and multi-mode optical switching infrastructure 1114 may be the same as—or similar to—optical fabric 412 of FIG. 4 and multi-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors, specialty processors, and/or FPGAs, for example—that is globally accessible to other sleds via optical fabric 1112 and multi-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and multi-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure (SDI) 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
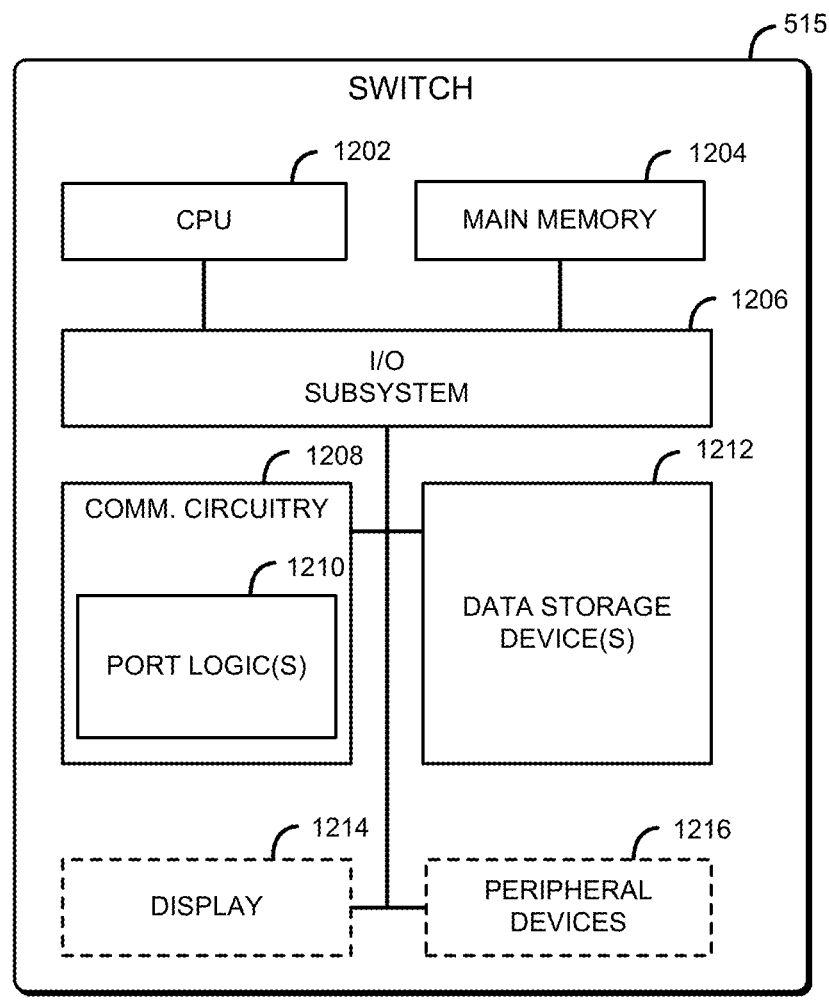
FIG. 12 is a simplified block diagram of at least one embodiment of a switch used in the connectivity scheme of FIG. 5.

Referring now to FIG. 12, the switch 515, in the illustrative embodiment, is a multi-mode optical switch that connects with sleds (e.g., sleds 704, 1004) through an optical connection (e.g., the optical fabric 1112) to provide higher bandwidth and lower latency than switches that connect with compute devices using typical twisted pair cabling (e.g., Category 5, Category 5e, Category 6, etc.). The higher bandwidth and lower latency interconnections enable the pooling of resources, such as memory, accelerators (e.g., graphics accelerators, FPGAs, ASICs, etc.), and data storage devices that are physically disaggregated, for use by compute resources (e.g., processors) to execute workloads on an as needed basis. More specifically, the high bandwidth and low latency provided by the optical connections and the corresponding switches 515 enable the physical resources 206 (shown in FIG. 2) located in various places in the data center 100, 300, 400 to provide similar responsiveness as if they were local to the processor making use of them. Furthermore, in the illustrative embodiment, the switch 515 is multi-mode, meaning it is capable of switching (i.e., forwarding) network traffic formatted according to two or more different link layer protocols, such as an HPC link layer protocol (e.g., Intel OmniPath), Ethernet, or any other specialized communications protocol such as raw accelerator intercommunication protocols, storage protocols, or even application-specific protocols that are not embedded/tunneled within existing Internet Protocol (IP) or OmniPath protocols.

Still referring to FIG. 12, the switch 515 may be embodied as any type of device capable of performing the functions described herein, including receiving network traffic from one or more devices through an optical connection, determining a communication protocol of the network traffic, determining the destination device for the network traffic using the communication protocol, and forwarding the network traffic to the destination device through another optical connection. For example, the switch 515 may be embodied as a computer, a multiprocessor system, or a network appliance (e.g., physical or virtual). As shown in FIG. 12, the illustrative switch 515 includes a central processing unit (CPU) 1202, a main memory 1204, an input/output (I/O) subsystem 1206, communication circuitry 1208, and one or more data storage devices 1212. Of course, in other embodiments, the switch 515 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1204, or portions thereof, may be incorporated in the CPU 1202.

The CPU 1202 may be embodied as any type of processor capable of performing the functions described herein. The CPU 1202 may be embodied as a single or multi-core processor(s), a microcontroller, or other processor or processing/controlling circuit. In some embodiments, the CPU 1202 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 1204 may be embodied as any type of volatile (e.g., dynamic random access memory (DRAM), etc.) or non-volatile memory or data storage capable of performing the functions described herein. In some embodiments, all or a portion of the main memory 1204 may be integrated into the CPU 1202. In operation, the main memory 1204 may store various software and data used during operation such as network traffic data, protocol data, address data, operating systems, applications, programs, libraries, and drivers.

The I/O subsystem 1206 may be embodied as circuitry and/or components to facilitate input/output operations with the CPU 1202, the main memory 1204, and other components of the switch 515. For example, the I/O subsystem 1206 may be embodied as, or otherwise include, memory controller hubs, input/output control hubs, integrated sensor hubs, firmware devices, communication links (e.g., silicon photonics, point-to-point links, bus links, wires, cables, light guides, printed circuit board traces, etc.), and/or other components and subsystems to facilitate the input/output operations. In some embodiments, the I/O subsystem 1206 may form a portion of a system-on-a-chip (SoC) and be incorporated, along with one or more of the CPU 1202, the main memory 1204, and other components of the switch 515, on a single integrated circuit chip.

The communication circuitry 1208 may be embodied as any communication circuit, device, or collection thereof, capable of enabling communications over the network between the switch 515 and other devices (e.g., other switches 515 or sleds 704). In the illustrative embodiment, the communication circuitry 1208 includes components similar to the multi-mode optical network interface circuitry 1026 described above with reference to FIG. 10. The communication circuitry 1208 may be configured to use multiple communication technologies (e.g., wired or wireless communications) and associated protocols (e.g., Intel InfiniBand, Ethernet, Bluetooth®, Wi-Fi®, WiMAX, etc.) to effect such communication. In the illustrative embodiment, the communication circuitry 1208 is configured to communicate through the optical fabric 1112 described with reference to FIG. 11.

The illustrative communication circuitry 1208 includes one or more port logics 1210. In the illustrative embodiment, each port logic 1210 may be embodied as an optical transceiver module 1027. Each port logic 1210 may be embodied as one or more add-in-boards, daughtercards, network interface cards, controller chips, chipsets, or other devices that may be used by the switch 515 to connect other devices (e.g., other switches 515 and/or sleds 704) through a network (e.g., the multi-mode optical switching infrastructure 514, 914, 1114). In the illustrative embodiment, the one or more port logics 1210 together enable concurrent communication with multiple other devices, (e.g., up to 1024 other devices). Further, in the illustrative embodiment, each device is connected to the port logics 1210 with one optical fiber for incoming network traffic (e.g., frames) and another optical fiber for outgoing network traffic. In some embodiments, the port logics 1210 may be embodied as part of a system-on-a-chip (SoC) that includes one or more processors, or included on a multichip package that also contains one or more processors. In some embodiments, each port logic 1210 may include a local processor (not shown) and/or a local memory (not shown) that are both local to the port logic 1210. In such embodiments, the local processor of the port logic 1210 may be capable of performing one or more of the functions of the CPU 1202 described herein. Additionally or alternatively, in such embodiments, the local memory of the port logic 1210 may be integrated into one or more components of the switch 515 at the board level, socket level, chip level, and/or other levels.

The one or more illustrative data storage devices 1212, may be embodied as any type of devices configured for short-term or long-term storage of data such as, for example, memory devices and circuits, memory cards, hard disk drives, solid-state drives, or other data storage devices. Each data storage device 1212 may include a system partition that stores data and firmware code for the data storage device 1212. Each data storage device 1212 may also include an operating system partition that stores data files and executables for an operating system.

Additionally, the switch 515 may include a display 1214. The display 1214 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 1214 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

Additionally or alternatively, the switch 515 may include one or more peripheral devices 1216. Such peripheral devices 1216 may include any type of peripheral device commonly found in a compute device such as speakers, a mouse, a keyboard, and/or other input/output devices, interface devices, and/or other peripheral devices.

Figure 13:
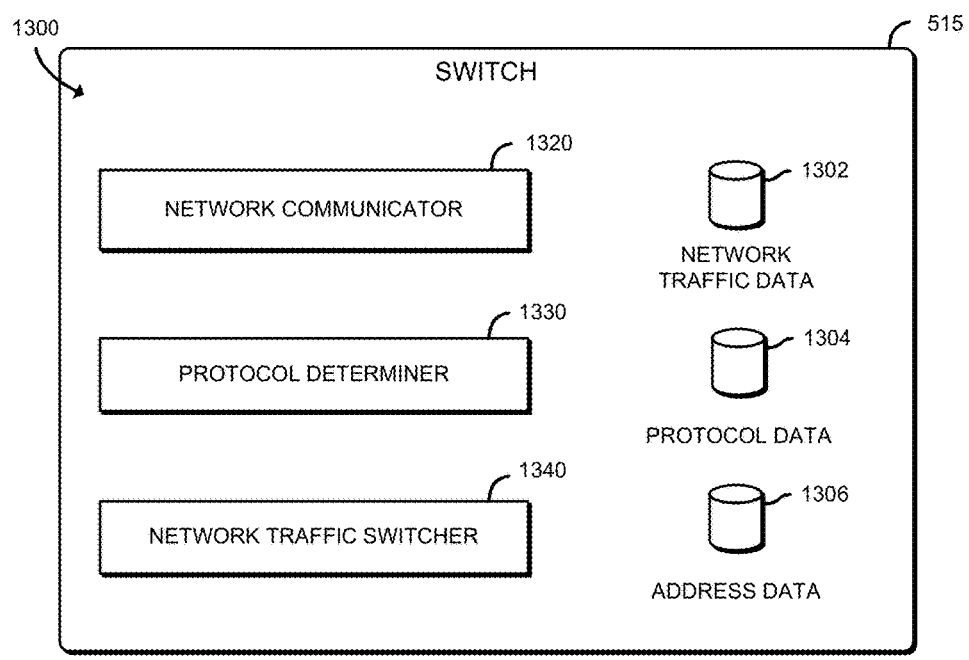
FIG. 13 is a simplified block diagram of at least one embodiment of an environment that may be established by the switch of FIGS. 5 and 12.

Referring now to FIG. 13, in the illustrative embodiment, the switch 515 may establish an environment 1300 during operation. The illustrative environment 1300 includes a network communicator 1320, a protocol determiner 1330, and a network traffic switcher 1340. Each of the components of the environment 1300 may be embodied as hardware, firmware, software, or a combination thereof. As such, in some embodiments, one or more of the components of the environment 1300 may be embodied as circuitry or a collection of electrical devices (e.g., network communicator circuitry 1320, protocol determiner circuitry 1330, network traffic switcher circuitry 1340, etc.). It should be appreciated that, in such embodiments, one or more of the network communicator circuitry 1320, protocol determiner circuitry 1330, or network traffic switcher circuitry 1340 may form a portion of one or more of the CPU 1202, the main memory 1204, the I/O subsystem 1206, and/or other components of the switch 515. The circuitry may be embodied as dedicated hardware or general purpose processor(s) executing code to implement desired functionality. In the illustrative embodiment, the environment 1300 includes network traffic data 1302 which may be embodied as set of data (e.g., frames) received from a source device (e.g., another switch 515 or physical resources 705 (e.g., a processor) residing on a sled 704), targeted to another device (e.g., another switch 515 or physical resources 705 (e.g., a processor) residing on a sled 704), and formatted pursuant to a corresponding communication protocol. Additionally, the illustrative environment 1300 includes protocol data 1304 indicative of the formats of various communication protocols (e.g., frame size, locations and sizes of fields within the frames, and/or one or more codes typically embedded in frames of a particular communication protocol) and rules (e.g., locations within the frame to identify the destination address, timing information on whether to forward the frame immediately or to delay forwarding for a defined period of time, whether and how to acknowledge receipt, etc.) for switching the network traffic pursuant to the corresponding protocol. Further, the illustrative environment 1300 includes address data 1306 indicative of unique addresses (e.g., media access control addresses) of devices (e.g., physical resources 705 (e.g., a processor) residing on sleds 704 and/or switches 515) connected to the present switch 515 and the corresponding physical ports where the optical fiber associated with each of the devices is connected.

In the illustrative environment 1300, the network communicator 1320, which may be embodied as hardware, firmware, software, virtualized hardware, emulated architecture, and/or a combination thereof as discussed above, is configured to facilitate inbound and outbound network communications (e.g., network traffic, network frames, network packets, network flows, etc.) to and from the switch 515, respectively. To do so, the network communicator 1320 is configured to receive and process network traffic (e.g., frames) from one device (e.g., another switch 515 or a sled 704) and to forward the network traffic to another device (e.g., another switch 515 or a sled 704) using address data encoded in the network traffic (e.g., in a frame header) in accordance with the corresponding protocol of the network traffic (e.g., an HPC communication protocol, an Ethernet protocol, etc.). Accordingly, in some embodiments, at least a portion of the functionality of the network communicator 1320 may be performed by the communication circuitry 1208, and, in the illustrative embodiment, by the one or more NICS 1210.

The protocol determiner 1330, which may be embodied as hardware, firmware, software, virtualized hardware, emulated architecture, and/or a combination thereof as discussed above, is configured to analyze a received frame of the network traffic data 1302, identify a format of the frame, such as by identifying a size of the frame, fields within the frame such as a header and a payload, and/or identifying one or more codes within the fields that are indicative of a particular communication protocol supported by the switch. In doing so, the protocol determiner 1330 may be configured to compare the identified format of the frame to the protocol data 1304 to identify a match and the corresponding rules for switching the network traffic.

The network traffic switcher 1340, which may be embodied as hardware, firmware, software, virtualized hardware, emulated architecture, and/or a combination thereof as discussed above, is configured to identify the address of the device to which each frame of network traffic is to be forwarded, by extracting the data from the frame pursuant to the identified network protocol (e.g., by extracting data from a particular location within the frame as specified in the protocol data), reading the address data 1306 to match the identified address to a physical port (e.g., an optical channel 1025) of the NICS 1210 where the device matching the identified address is connected to the switch 515, and issuing a request to the network communicator 1320 to transmit the frame of the network data through the physical port to the corresponding device.

Figure 14:
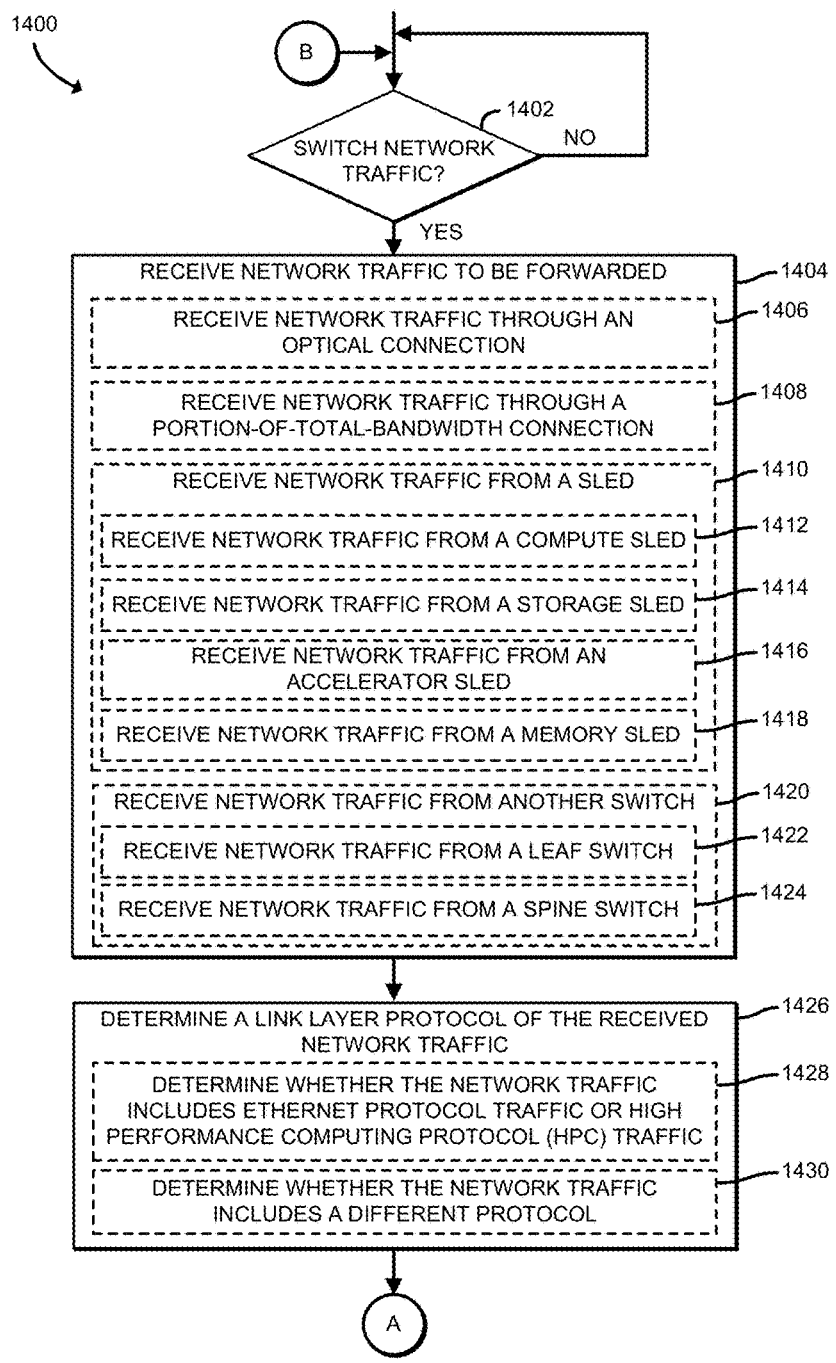
FIGS. 14-15 are a simplified flow diagram of at least one embodiment of a method for switching network traffic that may be performed by the switch of FIGS. 5, 12, and 13.

Referring now to FIG. 14, in use, the switch 515 may execute a method 1400 for switching network traffic. The method 1400 begins with block 1402, in which the switch 515 determines whether to switch network traffic. In the illustrative embodiment, the switch 515 determines to switch network traffic if the switch 515 is powered on and connected to the network (e.g., the multi-mode optical switching infrastructure 514, 914, 1114). In other embodiments, the switch 515 may determine whether to switch network traffic based on other factors. Regardless, in response to a determination to switch network traffic, in the illustrative embodiment, the method 1400 advances to block 1404 in which the switch 515 receives network traffic to be forwarded (i.e., switched). The network traffic may be formatted pursuant to any of multiple supported link layer communication protocols, including a high performance computing (HPC) protocol (e.g. Intel InfiniBand, etc.) or another type of link layer communication protocol, such as Ethernet.

In receiving the network traffic, the switch 515 may receive network traffic through an optical connection (e.g., optical fiber connected to the communication circuitry 1208), as indicated in block 1406. Further, in the illustrative embodiment, in receiving the network traffic to the be forwarded, the switch 515 receives the network traffic through a connection having a portion (e.g., one quarter or other portion) of the total bandwidth of a link (e.g., a 50 gigabit per second connection of a 200 gigabit per second link, a 100 gigabit per second connection of a 400 gigabit per second link, a 200 gigabit per second connection of an 800 gigabit per second link, etc.), as indicated in block 1408. As described herein, in the illustrative embodiment, the switch 515 is one of multiple switches (e.g., four switches) in the data center 100 that, together, provide a total amount of gigabits per second connection for the devices (e.g., the sleds 704) in the data center. In receiving the network traffic, the switch 515 may receive the network traffic from a sled 704, as indicated in block 1410. As an example, the network traffic received from the sled 704 may be the results from the execution of a workload that was assigned to the sled 704 or may be instructions from one sled 704 to another sled 704 to perform a particular operation (e.g., retrieve data, compress data, encrypt data, etc.) or the results of such an operation (e.g., retrieved data, compressed data, encrypted data, etc.). As such, the switch 515 may receive the network traffic from a compute sled 704, such as a sled 704 that includes one or more processors (e.g., physical compute resources 205-4), as indicated in block 1412. Additionally or alternatively, the switch 515 may receive the network traffic from a storage sled 704, such as a sled 704 that includes one or more data storage devices (e.g., physical storage resources 205-1), as indicated in block 1414. The switch 515 may additionally or alternatively receive the network traffic from an accelerator sled 704, such as a sled 704 that includes one or more co-processors, field programmable gate arrays (FPGAs) or other specialized hardware for performing a computation (e.g., physical accelerator resources 205-2), as indicated in block 1416. Additionally or alternatively, the switch 515 may receive the network traffic from a memory sled 704 such as a sled 704 that includes one or more memory devices (e.g., physical memory resources 205-3), as indicated in block 1418. The switch 515 may additionally or alternatively receive the network traffic from another switch, as indicated in block 1420. In doing so, the switch 515 may receive the network traffic from a leaf switch (e.g., a leaf switch 530 of FIG. 5) in a leaf-spine architecture, as indicated in block 1422. Alternatively, the switch 515 may receive the network traffic from a spine switch (e.g., a spine switch 520 of FIG. 5) in the leaf-spine architecture, as indicated in block 1424.

Still referring to FIG. 14, after receiving the network traffic, the method 1400 advances to block 1426 in which the switch 515 determines the link layer protocol of the network traffic, as indicated in block 1426. In doing so, the switch 515 may determine whether the network traffic includes Ethernet protocol traffic or HPC network traffic, as indicated in block 1428. Additionally or alternatively, the switch 515 may determine whether the network traffic includes traffic of a different network protocol (e.g., other than Ethernet or HPC traffic), as indicated in block 1430. As discussed above, the switch 515 may determine the type of network traffic by identifying aspects of the frame, such as a size of the frame, fields within the frame, and/or one or more codes included in the frame and comparing the aspects to the protocol data 1304 to determine whether a matching protocol (i.e., a set of reference aspects that match the identified aspects) is included therein. After determining the link layer protocol, the method 1400 advances to block 1432 of FIG. 15 in which the switch 515 forwards the network traffic.

Figure 15:
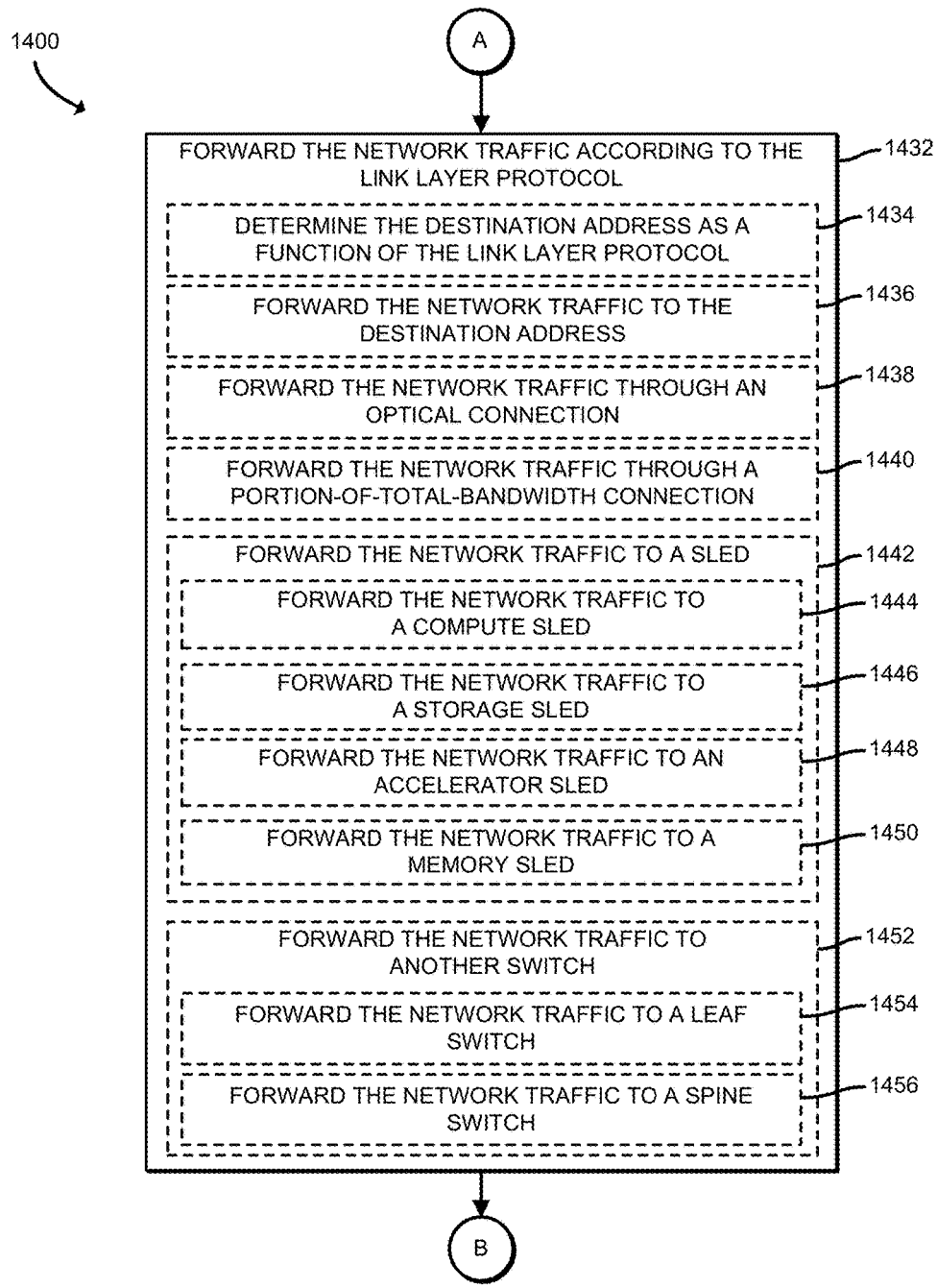

Referring now to FIG. 15, in block 1432, the switch 515 forwards the network traffic according to the link layer protocol (e.g., as a function of the corresponding rules defined in the protocol data 1304). In doing so, in the illustrative embodiment, the switch 515 determines the destination address as a function of the link layer protocol, as indicated in block 1434. In doing so, in the illustrative embodiment, the switch 515 identifies the address of the device to which each frame of network traffic is to be forwarded, by extracting the data from the frame pursuant to the identified communication protocol (e.g., by extracting data from a particular location within the frame as specified in the protocol data 1304) and reading the address data 1306 to match the identified address to a physical port of the NICS 1210 where the device matching the identified address is connected. In block 1436, in the illustrative embodiment, the switch 515 forwards the network traffic to the destination address. In the illustrative embodiment, in forwarding the network traffic, the switch 515, transmits the frame of the network data through the physical port matched above. Further, in the illustrative embodiment, the switch 515 forwards the network traffic through an optical connection (e.g., optical fiber), as indicated in block 1438. Moreover, in the illustrative embodiment, in forwarding the network traffic, the switch 515 forwards the network traffic through a connection having a portion (e.g., one quarter or other portion) of the total bandwidth of a link (e.g., a 50 gigabit per second connection of a 200 gigabit per second link, a 100 gigabit per second connection of a 400 gigabit per second link, a 200 gigabit per second connection of an 800 gigabit per second link, etc.), as indicated in block 1440.

Still referring to FIG. 15, as indicated in block 1442, in forwarding the network traffic, the switch 515 may forward the network traffic to a sled 704. In doing so, the switch 515 may forward the network traffic to a compute sled 704 as indicated in block 1444. Alternatively, the switch 515 may forward the network traffic to a storage sled 704, as indicated in block 1446. As indicated in block 1448, the switch 515 may forward the network traffic to an accelerator sled 704. Alternatively, as indicated in block 1450, the switch 515 may forward the network traffic to a memory sled 704. As indicated in block 1452, the switch 515 may alternatively forward the network traffic to another switch 515, such as to a leaf switch 530 as indicated in block 1454 or to a spine switch, as indicated in block 1456. After forwarding the network traffic, the method 1400 loops back to block 1402 of FIG. 14 to determine whether to continue switching the network traffic.

EXAMPLES

Illustrative examples of the technologies disclosed herein are provided below. An embodiment of the technologies may include any one or more, and any combination of, the examples described below.

Example 1 includes a network switch comprising one or more processors; communication circuitry coupled to the one or more processors, wherein the communication circuitry is to assist the one or more processors to switch network traffic of multiple link layer protocols; one or more memory devices having stored therein a plurality of instructions that, when executed, cause the network switch to receive, with the communication circuitry through an optical connection, network traffic to be forwarded; determine a link layer protocol of the received network traffic, wherein the received network traffic is formatted according to one of the multiple link layer protocols; and forward the network traffic as a function of the determined link layer protocol to a destination network device.

Example 2 includes the subject matter of Example 1, and wherein to receive the network traffic comprises to receive network traffic through an optical connection that provides one fourth of a total bandwidth of a link.

Example 3 includes the subject matter of any of Examples 1 and 2, and wherein to receive the network traffic comprises to receive the network traffic from a sled coupled to the optical connection.

Example 4 includes the subject matter of any of Examples 1-3, and wherein to receive the network traffic from a sled comprises to receive the network traffic from at least one of a compute sled that includes one or more processors, a storage sled that includes one or more data storage devices, an accelerator sled that includes one or more co-processors or field programmable gate arrays, or a memory sled that includes one or more memory devices.

Example 5 includes the subject matter of any of Examples 1-4, and wherein to receive the network traffic comprises to receive the network traffic from another network switch.

Example 6 includes the subject matter of any of Examples 1-5, and wherein to receive the network traffic from another network switch comprises to receive the network traffic from a leaf switch or a spine switch in a leaf-spine network architecture.

Example 7 includes the subject matter of any of Examples 1-6, and wherein the plurality of instructions further cause the network switch to forward traffic of two or more different link layer protocols.

Example 8 includes the subject matter of any of Examples 1-7, and wherein to determine a link layer protocol of the received network traffic comprises to determine whether the link layer protocol is an Ethernet protocol, a high performance computing (HPC) protocol, or other specialized communications protocol.

Example 9 includes the subject matter of any of Examples 1-8, and wherein to forward the network traffic as a function of the determined link layer protocol comprises to determine a destination address of the network traffic as a function of the determined link layer protocol.

Example 10 includes the subject matter of any of Examples 1-9, and wherein to forward the network traffic comprises to forward, with the communication circuitry, the network traffic through another optical connection to one of a sled or another network switch.

Example 11 includes the subject matter of any of Examples 1-10, and wherein to forward the network traffic comprises to forward the network traffic to one of a leaf switch or a spine switch in a leaf-spine network architecture.

Example 12 includes the subject matter of any of Examples 1-11, and wherein to forward the network traffic comprises to forward the network traffic through an optical connection that provides one fourth of a total bandwidth of a link.

Example 13 includes the subject matter of any of Examples 1-12, and wherein to forward the network traffic comprises to forward the network traffic to at least one of a compute sled that includes one or more processors, a storage sled that includes one or more data storage devices, an accelerator sled that includes one or more co-processors or field programmable gate arrays, or a memory sled that includes one or more memory devices.

Example 14 includes a method for switching network traffic comprising receiving, by a network switch through an optical connection, network traffic to be forwarded; determining, by the network switch, a link layer protocol of the received network traffic, wherein the determined link layer protocol is one of multiple link layer protocols supported by the switch; and forwarding, by the network switch, the network traffic as a function of the determined link layer protocol to a destination network device.

Example 15 includes the subject matter of Example 14, and wherein receiving the network traffic comprises receiving network traffic through an optical connection that provides one fourth of a total bandwidth of a link.

Example 16 includes the subject matter of any of Examples 14 and 15, and wherein receiving the network traffic comprises receiving the network traffic from a sled coupled to the optical connection.

Example 17 includes the subject matter of any of Examples 14-16, and wherein receiving the network traffic from a sled comprises receiving the network traffic from at least one of a compute sled that includes one or more processors, a storage sled that includes one or more data storage devices, an accelerator sled that includes one or more co-processors or field programmable gate arrays, or a memory sled that includes one or more memory devices.

Example 18 includes the subject matter of any of Examples 14-17, and wherein receiving the network traffic comprises receiving the network traffic from another network switch.

Example 19 includes the subject matter of any of Examples 14-18, and wherein receiving the network traffic from another network switch comprises to receiving the network traffic from a leaf switch or a spine switch in a leaf-spine network architecture.

Example 20 includes the subject matter of any of Examples 14-19, and further including forwarding, by the network switch, network traffic of two or more different link layer protocols.

Example 21 includes the subject matter of any of Examples 14-20, and wherein determining a link layer protocol of the received network traffic comprises determining whether the link layer protocol is an Ethernet protocol, a high performance computing (HPC) protocol, or other specialized communications protocol.

Example 22 includes the subject matter of any of Examples 14-21, and wherein forwarding the network traffic as a function of the determined link layer protocol comprises determining a destination address of the network traffic as a function of the determined link layer protocol.

Example 23 includes the subject matter of any of Examples 14-22, and wherein forwarding the network traffic comprises forwarding the network traffic through another optical connection to one of a sled or another network switch.

Example 24 includes the subject matter of any of Examples 14-23, and wherein forwarding the network traffic comprises forwarding the network traffic to one of a leaf switch or a spine switch in a leaf-spine network architecture.

Example 25 includes the subject matter of any of Examples 14-24, and wherein forwarding the network traffic comprises forwarding the network traffic through an optical connection that provides one fourth of a total bandwidth of a link.

Example 26 includes the subject matter of any of Examples 14-25, and wherein forwarding the network traffic comprises forwarding the network traffic to at least one of a compute sled that includes one or more processors, a storage sled that includes one or more data storage devices, an accelerator sled that includes one or more co-processors or field programmable gate arrays, or a memory sled that includes one or more memory devices.

Example 27 includes one or more machine-readable storage media comprising a plurality of instructions stored thereon that in response to being executed, cause a network switch to perform the method of any of Examples 14-26.

Example 28 includes a network switch comprising one or more processors; communication circuitry coupled to the one or more processors; one or more memory devices having stored therein a plurality of instructions that, when executed, cause the network switch to perform the method of any of Examples 14-26.

Example 29 includes a network switch comprising means for performing the method of any of Examples 14-26.

Example 30 includes a network switch comprising network communicator circuitry to receive, through an optical connection, network traffic to be forwarded; protocol determiner circuitry to determine a link layer protocol of the received network traffic, wherein the received network traffic is formatted according to one of multiple link layer protocols; and network traffic switcher circuitry to forward the network traffic as a function of the determined link layer protocol to a destination network device.

Example 31 includes the subject matter of Example 30, and wherein to receive the network traffic comprises to receive network traffic through an optical connection that provides one fourth of a total bandwidth of a link.

Example 32 includes the subject matter of any of Examples 30 and 31, and wherein to receive the network traffic comprises to receive the network traffic from a sled coupled to the optical connection.

Example 33 includes the subject matter of any of Examples 30-32, and wherein to receive the network traffic from a sled comprises to receive the network traffic from at least one of a compute sled that includes one or more processors, a storage sled that includes one or more data storage devices, an accelerator sled that includes one or more co-processors or field programmable gate arrays, or a memory sled that includes one or more memory devices.

Example 34 includes the subject matter of any of Examples 30-33, and wherein to receive the network traffic comprises to receive the network traffic from another network switch.

Example 35 includes the subject matter of any of Examples 30-34, and wherein to receive the network traffic from another network switch comprises to receive the network traffic from a leaf switch or a spine switch in a leaf-spine network architecture.

Example 36 includes the subject matter of any of Examples 30-35, and wherein the network traffic switcher circuitry is further to forward traffic of two or more different link layer protocols.

Example 37 includes the subject matter of any of Examples 30-36, and wherein to determine a link layer protocol of the received network traffic comprises to determine whether the link layer protocol is an Ethernet protocol, a high performance computing (HPC) protocol, or other specialized communications protocol.

Example 38 includes the subject matter of any of Examples 30-37, and wherein to forward the network traffic as a function of the determined link layer protocol comprises to determine a destination address of the network traffic as a function of the determined link layer protocol.

Example 39 includes the subject matter of any of Examples 30-38, and wherein to forward the network traffic comprises to forward the network traffic through another optical connection to one of a sled or another network switch.

Example 40 includes the subject matter of any of Examples 30-39, and wherein to forward the network traffic comprises to forward the network traffic to one of a leaf switch or a spine switch in a leaf-spine network architecture.

Example 41 includes the subject matter of any of Examples 30-40, and wherein to forward the network traffic comprises to forward the network traffic through an optical connection that provides one fourth of a total bandwidth of a link.

Example 42 includes the subject matter of any of Examples 30-41, and wherein to forward the network traffic comprises to forward the network traffic to at least one of a compute sled that includes one or more processors, a storage sled that includes one or more data storage devices, an accelerator sled that includes one or more co-processors or field programmable gate arrays, or a memory sled that includes one or more memory devices.

Example 43 includes a network switch comprising circuitry for receiving, through an optical connection, network traffic to be forwarded; means for determining a link layer protocol of the received network traffic, wherein the received network traffic is formatted according to one of one of multiple link layer protocols; and means for forwarding the network traffic as a function of the determined link layer protocol to a destination network device.

Example 44 includes the subject matter of Example 43, and wherein the circuitry for receiving the network traffic comprises circuitry for receiving network traffic through an optical connection that provides one fourth of a total bandwidth of a link.

Example 45 includes the subject matter of any of Examples 43 and 44, and wherein the circuitry for receiving the network traffic comprises circuitry for receiving the network traffic from a sled coupled to the optical connection.

Example 46 includes the subject matter of any of Examples 43-45, and wherein the circuitry for receiving the network traffic from a sled comprises circuitry for receiving the network traffic from at least one of a compute sled that includes one or more processors, a storage sled that includes one or more data storage devices, an accelerator sled that includes one or more co-processors or field programmable gate arrays, or a memory sled that includes one or more memory devices.

Example 47 includes the subject matter of any of Examples 43-46, and wherein the circuitry for receiving the network traffic comprises circuitry for receiving the network traffic from another network switch.

Example 48 includes the subject matter of any of Examples 43-47, and wherein the circuitry for receiving the network traffic from another network switch comprises circuitry for receiving the network traffic from a leaf switch or a spine switch in a leaf-spine network architecture.

Example 49 includes the subject matter of any of Examples 43-48, and further including means for forwarding network traffic of two or more different link layer protocols.

Example 50 includes the subject matter of any of Examples 43-49, and wherein the means for determining a link layer protocol of the received network traffic comprises means for determining whether the link layer protocol is an Ethernet protocol, a high performance computing (HPC) protocol, or other specialized communications protocol.

Example 51 includes the subject matter of any of Examples 43-50, and wherein the means for forwarding the network traffic as a function of the determined link layer protocol comprises means for determining a destination address of the network traffic as a function of the determined link layer protocol.

Example 52 includes the subject matter of any of Examples 43-51, and wherein the means for forwarding the network traffic comprises means for forwarding the network traffic through another optical connection to one of a sled or another network switch.

Example 53 includes the subject matter of any of Examples 43-52, and wherein the means for forwarding the network traffic comprises means for forwarding the network traffic to one of a leaf switch or a spine switch in a leaf-spine network architecture.

Example 54 includes the subject matter of any of Examples 43-53, and wherein the means for forwarding the network traffic comprises means for forwarding the network traffic through an optical connection that provides one fourth of a total bandwidth of a link.

Example 55 includes the subject matter of any of Examples 43-54, and wherein the means for forwarding the network traffic comprises means for forwarding the network traffic to at least one of a compute sled that includes one or more processors, a storage sled that includes one or more data storage devices, an accelerator sled that includes one or more co-processors or field programmable gate arrays, or a memory sled that includes one or more memory devices.

Example 56 includes a data center comprising a plurality of racks each containing a plurality of sleds; one or more multi mode optical switches coupled to the sleds by an optical connection, wherein the racks do not comprise a top-of-rack switch.

Example 57 includes the subject matter of Example 56, and wherein the one or more switches comprise multiple switches and each switch is connected to each of the sleds by an upstream optical connection and a downstream optical connection.

Example 58 includes the subject matter of any of Examples 56 and 57, and wherein each optical connection provides one fourth of a total bandwidth of a switch link.

Example 59 includes the subject matter of any of Examples 56-58, and wherein a first subgroup of the sleds is to communicate with a first link layer protocol; and a second subgroup of the sleds is to communicate with a second link layer protocol that is different than the first link layer protocol; and the one or more switches are to concurrently switch network traffic among the plurality of sleds with at least the first link layer protocol and the second link layer protocol.

Example 60 includes the subject matter of any of Examples 56-59, and wherein the first link layer protocol is a non-Ethernet protocol and the second link layer protocol is an Ethernet protocol.

Example 61 includes the subject matter of any of Examples 56-60, and wherein the one or more switches comprise a plurality of switches arranged in a leaf-spine architecture.

Example 62 includes the subject matter of any of Examples 56-61, and wherein each sled comprises one or more physical resources, the one or more switches comprise four switches, each sled is coupled to each of the four switches, and each physical resource of each sled is coupled to the four switches.

Example 63 includes the subject matter of any of Examples 56-62, and wherein the one or more switches are arranged in a two-layer switch architecture.

Example 64 includes the subject matter of any of Examples 56-63, and wherein at least one of the switches is a spine switch connected to each sled at one fourth of a total switch link bandwidth.

Example 65 includes the subject matter of any of Examples 56-64, and wherein the spine switch is additionally connected to one or more other connections at the total switch link bandwidth.

Example 66 includes the subject matter of any of Examples 56-65, and wherein the at least one spine switch is a plurality of spine switches.

Example 67 includes a data center comprising a layer of spine switches; a plurality of racks, wherein each rack includes multiple sleds, and wherein each sled is to connect multiple other sleds with the layer of spine switches.

Example 68 includes a data center comprising a two-layer switch system that includes a layer of spine switches; and a layer of leaf switches connected to the layer of spine switches; and a plurality of racks, wherein each rack includes multiple sleds, and wherein each sled is to connect multiple other sleds with the two-layer switch system.

The invention claimed is:

1. A network switch comprising:
one or more processors;
communication circuitry coupled to the one or more processors, wherein the communication circuitry is to assist the one or more processors to switch network traffic of multiple link layer protocols;
one or more memory devices having stored therein a plurality of instructions that, when executed, cause the network switch to:
receive, with the communication circuitry through an optical connection, network traffic to be forwarded;
determine a link layer protocol of the received network traffic, wherein the received network traffic is formatted according to one of the multiple link layer protocols; and
forward the network traffic as a function of the determined link layer protocol to a destination network device.

2. The network switch of claim 1, wherein to receive the network traffic comprises to receive network traffic through an optical connection that provides one fourth of a total bandwidth of a link.

3. The network switch of claim 1, wherein to receive the network traffic comprises to receive the network traffic from a sled coupled to the optical connection.

4. The network switch of claim 3, wherein to receive the network traffic from a sled comprises to receive the network traffic from at least one of a compute sled that includes one or more processors, a storage sled that includes one or more data storage devices, an accelerator sled that includes one or more co-processors or field programmable gate arrays, or a memory sled that includes one or more memory devices.

5. The network switch of claim 1, wherein to receive the network traffic comprises to receive the network traffic from another network switch.

6. The network switch of claim 5, wherein to receive the network traffic from another network switch comprises to receive the network traffic from a leaf switch or a spine switch in a leaf-spine network architecture.

7. The network switch of claim 1, wherein the plurality of instructions further cause the network switch to forward traffic of two or more different link layer protocols.

8. The network switch of claim 1, wherein to determine a link layer protocol of the received network traffic comprises to determine whether the link layer protocol is an Ethernet protocol, a high performance computing (HPC) protocol, or other specialized communications protocol.

9. The network switch of claim 8, wherein to forward the network traffic as a function of the determined link layer protocol comprises to determine a destination address of the network traffic as a function of the determined link layer protocol.

10. The network switch of claim 1, wherein to forward the network traffic comprises to forward, with the communication circuitry, the network traffic through another optical connection to one of a sled or another network switch.

11. The network switch of claim 1, wherein to forward the network traffic comprises to forward the network traffic to one of a leaf switch or a spine switch in a leaf-spine network architecture.

12. The network switch of claim 1, wherein to forward the network traffic comprises to forward the network traffic through an optical connection that provides one fourth of a total bandwidth of a link.

13. One or more machine-readable storage media comprising a plurality of instructions stored thereon that, in response to being executed, cause a network switch to:
receive, with communication circuitry through an optical connection, network traffic to be forwarded;
determine a link layer protocol of the received network traffic, wherein the received network traffic is formatted according to one of multiple link layer protocols; and
forward the network traffic as a function of the determined link layer protocol to a destination network device.

14. The one or more machine-readable storage media switch of claim 13, wherein to receive the network traffic comprises to receive network traffic through an optical connection that provides one fourth of a total bandwidth of a link.

15. The one or more machine-readable storage media of claim 13, wherein to receive the network traffic comprises to receive the network traffic from a sled coupled to the optical connection.

16. The one or more machine-readable storage media of claim 15, wherein to receive the network traffic from a sled comprises to receive the network traffic from at least one of a compute sled that includes one or more processors, a storage sled that includes one or more data storage devices, an accelerator sled that includes one or more co-processors or field programmable gate arrays, or a memory sled that includes one or more memory devices.

17. The one or more machine-readable storage media of claim 13, wherein to receive the network traffic comprises to receive the network traffic from another network switch.

18. The one or more machine-readable storage media of claim 17, wherein to receive the network traffic from another network switch comprises to receive the network traffic from a leaf switch or a spine switch in a leaf-spine network architecture.

19. The one or more machine-readable storage media of claim 13, wherein the plurality of instructions further cause the network switch to forward traffic of two or more different link layer protocols.

20. The one or more machine-readable storage media of claim 13, wherein to determine a link layer protocol of the received network traffic comprises to determine whether the link layer protocol is an Ethernet protocol, a high performance computing (HPC) protocol, or other specialized communications protocol.

21. The one or more machine-readable storage media of claim 20, wherein to forward the network traffic as a function of the determined link layer protocol comprises to determine a destination address of the network traffic as a function of the determined link layer protocol.

22. The one or more machine-readable storage media of claim 13, wherein to forward the network traffic comprises to forward, with the communication circuitry, the network traffic through another optical connection to one of a sled or another network switch.

23. The one or more machine-readable storage media of claim 13, wherein to forward the network traffic comprises to forward the network traffic to one of a leaf switch or a spine switch in a leaf-spine network architecture.

24. The one or more machine-readable storage media of claim 13, wherein to forward the network traffic comprises to forward the network traffic through an optical connection that provides one fourth of a total bandwidth of a link.

25. A network switch comprising:
circuitry for receiving, through an optical connection, network traffic to be forwarded;
means for determining a link layer protocol of the received network traffic, wherein the received network traffic is formatted as a function of one of multiple link layer protocols supported by the network switch; and
means for forwarding the network traffic as a function of the determined link layer protocol.

26. A method for switching network traffic comprising:
receiving, by a network switch through an optical connection, network traffic to be forwarded;
determining, by the network switch, a link layer protocol of the received network traffic, wherein the determined link layer protocol is one of multiple link layer protocols supported by the switch; and
forwarding, by the network switch, the network traffic as a function of the determined link layer protocol to a destination network device.

27. The method of claim 26, wherein receiving the network traffic comprises receiving network traffic through an optical connection that provides one fourth of a total bandwidth of a link.

28. The method of claim 26, wherein receiving the network traffic comprises receiving the network traffic from a sled coupled to the optical connection.

29. The method of claim 28, wherein receiving the network traffic from a sled comprises receiving the network traffic from at least one of a compute sled that includes one or more processors, a storage sled that includes one or more data storage devices, an accelerator sled that includes one or more co-processors or field programmable gate arrays, or a memory sled that includes one or more memory devices.

30. The method of claim 26, wherein receiving the network traffic comprises receiving the network traffic from another network switch.

* * * * *